(12) United States Patent
Kim et al.

(10) Patent No.: US 11,460,615 B2
(45) Date of Patent: Oct. 4, 2022

(54) REFLECTOR HAVING INFORMATION GENERATION FUNCTION

(71) Applicant: Hong Jin Kim, Changwon-si (KR)

(72) Inventors: Hong Jin Kim, Changwon-si (KR); Hye Young Jang, Changwon-si (KR)

(73) Assignee: Hong Jin Kim, Changwon-si (KR)

( * ) Notice: Subject to any disclaimer, the term of this patent is extended or adjusted under 35 U.S.C. 154(b) by 276 days.

(21) Appl. No.: 16/956,884

(22) PCT Filed: Jan. 10, 2019

(86) PCT No.: PCT/KR2019/000382
§ 371 (c)(1),
(2) Date: Jun. 22, 2020

(87) PCT Pub. No.: WO2019/139370
PCT Pub. Date: Jul. 18, 2019

(65) Prior Publication Data
US 2020/0326460 A1 Oct. 15, 2020

(30) Foreign Application Priority Data

Jan. 15, 2018 (KR) .................. 10-2018-0004866

(51) Int. Cl.
*G02B 5/12* (2006.01)
*E01F 9/30* (2016.01)
(Continued)

(52) U.S. Cl.
CPC ................ *G02B 5/124* (2013.01); *E01F 9/30* (2016.02); *E01F 9/608* (2016.02); *E01F 9/619* (2016.02)

(58) Field of Classification Search
CPC .. E01F 9/30; E01F 9/608; E01F 9/619; G02B 5/124
See application file for complete search history.

(56) References Cited

U.S. PATENT DOCUMENTS

| 1,739,733 | A | * | 12/1929 | Persons | ................... | E01F 9/619 |
| | | | | | | 362/348 |
| 2011/0035140 | A1 | * | 2/2011 | Candy | ..................... | E01F 9/578 |
| | | | | | | 701/119 |

(Continued)

FOREIGN PATENT DOCUMENTS

| JP | 06-259696 A | 9/1994 |
| JP | 09-282593 A | 10/1997 |

(Continued)

*Primary Examiner* — Abigail A Risic
(74) *Attorney, Agent, or Firm* — Novick, Kim & Lee, PLLC; Jae Youn Kim

(57) ABSTRACT

A reflector having an information generation function, wherein information allowing a quick and clear understanding of a traffic system and the surrounding environment thereof can be generated by a combination of unit reflectors recognizable by a light detection and ranging (Lidar) or radio detecting and ranging (Radar) system, is proposed. The reflector includes a plurality of unit reflectors for representing information through code generation, wherein each of the unit reflectors represents information by reflecting light beams or radio waves therefrom or transmitting the same therethrough, whereby binary-coded information is generated using the reflector, which allows a Lidar system or a Radar system to recognize the generated information.

14 Claims, 9 Drawing Sheets

(51) Int. Cl.
    *E01F 9/60*     (2016.01)
    *G02B 5/124*     (2006.01)
    *E01F 9/608*     (2016.01)
    *E01F 9/619*     (2016.01)

(56) References Cited

U.S. PATENT DOCUMENTS

| | | | | |
|---|---|---|---|---|
| 2019/0227206 | A1* | 7/2019 | Weingaertner | G02B 5/122 |
| 2020/0048847 | A1* | 2/2020 | Retterath | G02B 5/124 |
| 2020/0408520 | A1* | 12/2020 | Jensen | G02B 5/124 |
| 2021/0180274 | A1* | 6/2021 | Clear | B32B 7/12 |
| 2021/0183246 | A1* | 6/2021 | Zack | E01F 9/30 |
| 2021/0230822 | A1* | 7/2021 | Yamamoto | G08G 1/042 |
| 2021/0364679 | A1* | 11/2021 | Tontsch | G02B 5/124 |

FOREIGN PATENT DOCUMENTS

| | | |
|---|---|---|
| JP | 2007-129420 A | 5/2007 |
| JP | 2009-063544 A | 3/2009 |
| JP | 2013-190402 A | 9/2013 |
| KR | 10-1014578 B1 | 2/2011 |
| KR | 10-1353052 B1 | 1/2014 |

\* cited by examiner

REFLECTOR HAVING INFORMATION GENERATION FUNCTION

TECHNICAL FIELD

The present invention relates to a reflector having information generation function, and more particularly, to a reflector having information generation function which can quickly and clearly recognize a traffic system and a surrounding environment through a combination of a unit reflector that can be recognized by a Lidar (light detection and ranging) and a Radar (radio detecting and ranging) system.

BACKGROUND ART

Traditionally, a circular or triangular plate on which a specific standardized symbol is drawn has been used as a traffic sign board. A traffic sign board recognition device that recognizes the shape and sign of the traffic sign board by using an image processing technique has been developed to improve the driving stability and convenience by informing the driver of the driving environment on the current road.

Such a traffic sign board is implemented in various types such as a flat type, a light emitting type, and a reflective type.

The flat and luminescent traffic sign boards are flat, so it is impossible for a lidar or radar system to recognize the information on the traffic signs.

Since the reflective traffic sign board is a reflector designed to retransmit light or radio waves transmitted from a lidar or radar system back to the transmission side, the reflective traffic sign board is designed to enable the lidar or radar system to recognize the information on the reflector.

In addition, a traffic signal light installed on a road provides information about the traffic of vehicles or pedestrians, thereby providing safe vehicle traffic for drivers, and promoting stability for pedestrians in walking.

As examples of the related art, there have been disclosed reflective traffic sign boards and techniques for recognizing the reflective traffic sign boards in <Patent document 1> and <Patent document 2>.

According to the related art disclosed in <Patent document 1>, a one-side groove angle, defined by a V-groove vertical surface and a line segment that is formed by allowing a common plane and a plane vertical to the common plane and vertical to the V-groove vertical surface including the bottom side of a V-shaped groove to cross a reflection side surface including the bottom side of the V-shaped groove, does not form a constant angle within the reflection side surface, and the reflection side surface forms a curved surface and/or a complex plane. A bottom side constituting a V-shaped groove in either direction in a retro-reflection element pair is a non-linear bottom side that does not form a linear path, and a reflection side surface formed by the V-shaped groove forms a curved surface and/or a complex plane.

According to the configuration described above, a retroreflective article formed of many triangular-pyramidal cube-corner retroreflective element pairs is provided and a cube-corner retroreflective article arranged in a closest-packed form is provided by the triangular-pyramidal cube-corner retroreflective element.

In addition, the related art disclosed in <Patent document 2> provides an image recognition system for a vehicle for traffic sign board recognition, wherein an exposure time of a camera lens or gain of an image output from an image sensor is adjusted to generate at least one image group including a plurality of frames in which the exposure time and the gain are different from each other, sign board regions of the plurality of frames are compared with each other, an image nearest to a predetermined set value is selected, and at least one of the plurality of frames is an auto-exposure control frame in which brightness of entire of a screen or a region of interest in the screen is constantly maintained.

By the configuration described above, it is possible to improve the recognition performance of a traffic sign board, improve the recognition performance of a reflective traffic sign board and a light emitting type traffic sign board by adjusting an exposure of a camera, improve the recognition performance of the reflective traffic sign board and the light emitting type traffic sign board by adjusting gain of an image signal, and improve the recognition performance of the reflective traffic sign board and the light emitting type traffic sign board by simultaneously adjusting the exposure of the camera and the gain of the image signal.

DOCUMENT OF RELATED ART (Patent document 1) Korean Patent Registration No. 10-1014578 (issued on Feb. 16, 2011; Triangular pyramid type cube corner retroreflection article having curved reflection side surface)

(Patent document 2) Korean Patent Registration No. 10-1353052 (issued on Jan. 20, 2014; Image recognition system for vehicle for traffic sign board recognition)

DISCLOSURE

Technical Problem

However, the general traffic sign board and traffic signal light described above are composed of planes and are developed and installed to be clearly recognized by the human sensory system, so that it is impossible to recognize them through sensors installed in artificial intelligence (AI), robots, and autonomous vehicles (AV).

In addition, according to the related art, although a lidar or radar system can recognize information by using a reflective traffic sign board, it is impossible to transmit a specific message by using the traffic sign board.

In addition, the conventional reflective traffic sign board is not adapted in association with the license plate of a vehicle, so the conventional reflective traffic sign board cannot be used for the purpose of exchanging information of each vehicle or between vehicles and it cannot be used for vehicle speed measurement or vehicle regulation.

In addition, according to the related art, the recognition rate of the reflective traffic sign board may be improved, but it is impossible to transmit various messages by using the reflective traffic sign board.

In addition, in the transition period before a person is completely excluded from driving by operating a traffic system consisting only of an autonomous vehicle (AV), robot, and artificial intelligence system, a device for transmitting road conditions and traffic information which can be recognized independently in the field without connecting the driver and the AV is necessarily required.

Therefore, the present invention has been proposed to solve all the problems in the related art and the need in the transition period as described above. One object of the present invention is to provide a reflector having an information generation function which can generate information by which a traffic system and a surrounding environment are quickly and clearly recognized through a combination of unit reflectors that can be recognized by lidar (light detection and ranging) and radar (radio detecting and ranging) systems.

Another object of the present invention is to provide a reflector having an information generation function, which can provide a code system by defining characters and symbols with a combination of reflectors that can be recognized by lidar and radar systems, so that human traffic systems and surrounding environment information can be quickly and clearly recognized by artificial intelligence, robots, and autonomous vehicles.

Technical Solution

To achieve the objects, in accordance with an aspect of the present invention, there is provided a reflector having an information generation function, which includes a plurality of unit reflectors for representing information through code generation, wherein each of the plurality of reflectors reflects or transmits light or a radio wave to represent information.

The unit reflector generates a binary code to represent information.

Each of the plurality of unit reflectors has a polygonal shape, and the plurality of unit reflectors are combined to form a hexagonal shape.

The plurality of unit reflectors generate 6-bit information using each unit reflector.

The unit reflectors are combined such that reflective surfaces of adjacent unit reflectors are connected at 90° based on a front surface.

The unit reflector is formed with a plurality of reflective surfaces for receiving and reflecting light or radio waves, and the plurality of reflective surfaces are combined to have a triangular pyramid shape.

The reflective surface of the unit reflector is formed of a metal material to reflect light or radio waves.

Lenses are formed on front surfaces of the plurality of unit reflectors to increase a focus and a sharpness of a reflected light.

The lens is formed as a single lens that accommodates all the unit reflectors, or formed as a plurality of lenses, the number of which corresponds to that of unit reflectors.

The information includes at least one of an English alphabet, a Korean alphabet, a symbolic character, a graphic character, a Greek character, a ruled character, a unit character, a circular character, a parentheses character, a katakana character, and a hiragana character.

In accordance with another aspect of the present invention, there is provided a reflector having an information generation function, which includes a plurality of unit reflectors for representing information through code generation; and an opening and closing unit for opening or closing a plurality of reflective surfaces constituting each unit reflector to generate a code.

The opening and closing unit includes a fixing unit including one of a hinge, a magnet, a Velcro, and a tape.

The reflector having an information generation function includes a controller configured to control opening or closing of the plurality of reflective surfaces; and an actuator configured to automatically operate the opening and closing unit according to control of the control unit.

The opening and closing unit is configured to open the plurality of reflective surfaces rearward from a closed state or to restore the plurality of reflective surfaces to an initial state.

The reflector having an information generation function further includes an information setting unit configured to set information to be represented.

The controller is configured to control an operation of the actuator based on the information set by the information setting unit to represent information by opening or closing the plurality of unit reflectors.

The reflector having an information generation function further includes a signal interworking unit configured to interwork with a traffic signal light controller for controlling a traffic signal light to receive traffic signal light information.

The controller is configured to recognize the traffic signal light information, which is received through the signal interworking unit, as a binary and control the actuator to represent information corresponding to the traffic signal light.

Advantageous Effects

According to the present invention, the reflector having an information generation function can generate information by which a traffic system and a surrounding environment are quickly and clearly recognized through a combination of unit reflectors that can be recognized by lidar (light detection and ranging) and radar (radio detecting and ranging) systems.

In addition, according to the present invention, the reflector having an information generation function can provide a code system by defining characters and symbols with a combination of reflectors that can be recognized by lidar and radar systems, so that human traffic systems and surrounding environment information can be quickly and clearly recognized by artificial intelligence, robots, and autonomous vehicles.

DESCRIPTION OF DRAWINGS

FIG. 4 is a view illustrating one example of a code system applied to the present invention.

BEST MODE

Mode for Invention

Hereinafter, a reflector having an information generation function according to a preferred embodiment of the present invention will be described in detail with reference to the accompanying drawings.

A reflector having an information generating function according to the present invention is roughly classified into a manual scheme in which a user specifies information to be displayed in a fixed form in advance, and an automatic scheme which automatically changes information through input setting to display the information.

For example, the reflector according to the present invention may be operated in a manual scheme that provides only preset information by using the reflector as a traffic sign or a license plate while a user has fixed the information of the reflector as specific information. The reflector may be operated in an automatic scheme that provides variable information according to a remote control or setting of a user.

Hereinafter, a scheme of manually using the reflector (Embodiment 1) and a scheme of automatically using the reflector (Embodiment 2) will be described separately.

Embodiment 1

Figure 1A:
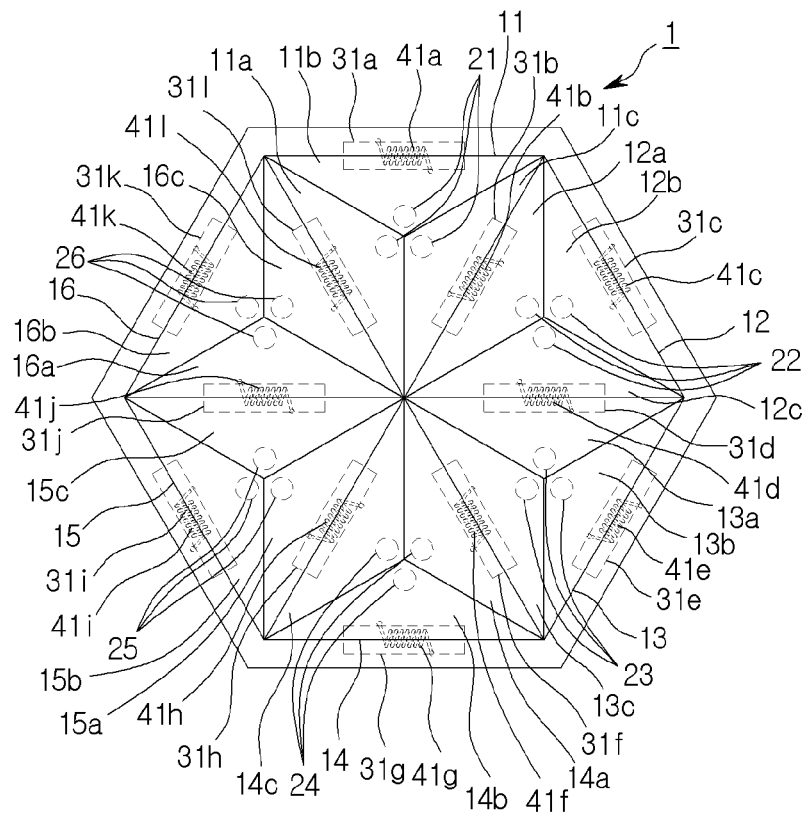
FIG. 1A is a front view of a reflector having an information generation function according to a first embodiment of the present invention.
Figure 1B:
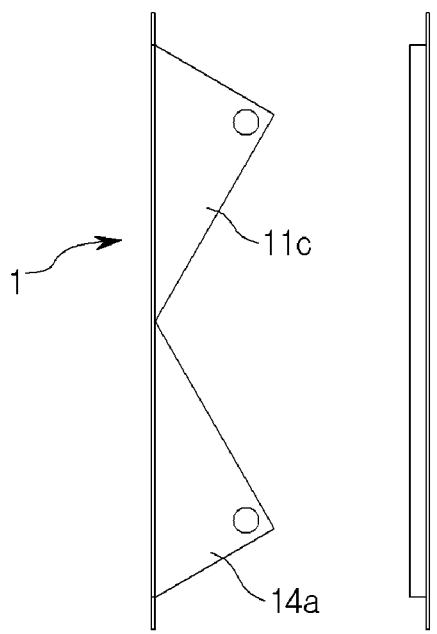
FIG. 1B is a cross-sectional view of a reflector having an information generation function the first embodiment of the present invention.

FIG. 1A is a front view of a reflector having an information generation function according to a first embodiment of the present invention. FIG. 1B is a cross-sectional view of a reflector having an information generation function the first embodiment of the present invention.

A reflector 1 having an information generation function according to the first embodiment of the present invention is implemented by connecting a plurality of unit reflectors 11 to 16 that represent information through code generation, where each unit reflector 11 to 16 reflects or transmits light or radio waves to represent information. In this case, the unit reflectors mean small reflectors having the same size and shape that constitute the entire reflector 1.

Since the configuration and operation of each unit reflector 11 to 16 are the same, only one reflector (e.g., the unit reflector 11) will be described below.

The unit reflector 11 is formed with a plurality of reflective surfaces 11a to 11c capable of receiving and reflecting light or radio waves, and has a triangular pyramid shape by combining the plurality of reflective surfaces 11a to 11c. Each reflective surface is preferably manufactured by using a metal material, or attaching a metal film thereon or coating a metal material to reflect light or radio waves. It is preferable to form the inner surface of the reflector of a metal surface of a thin film with high roughness.

Further, in order to increase the focus and sharpness of the reflected light, a lens may be added to the front surfaces of the plurality of unit reflectors 11 to 16. The lens may be formed as a single lens that accommodates all the unit reflectors, or may be formed as a plurality of lenses, the number of which corresponds to that of unit reflectors. The lens may be installed to be spaced apart from the front surface of the reflector 1 by a predetermined interval, and be simply installed in a scheme of fixing one end of the lens to one end of the reflector 1.

In addition, the triangular pyramid shaped unit reflector 11 including a plurality of reflective surfaces is combined (arranged) to allow the reflective surface of an adjacent unit reflector (e.g., 12) to be connected at an angle of 90° based on the front surface thereof, so that the reflector 1 is implemented to generate information.

Preferably, the single unit reflector 11 generates a code in binary (0, 1) to express information. A real lidar system or a radar system transmits light or radio waves, and receives light or radio waves reflected from the reflector 1 to recognize information. Therefore, when the unit reflector 11 is closed, light or radio waves are reflected, and thus a sign "1" is generated, When the unit reflector 11 is opened, light or radio waves are transmitted and there is no reflected signal, and thus a sign "0" is generated. One unit reflector represents one bit of information.

In this case, in order to represent information with the unit reflector 11, an opening and closing unit for opening or closing each unit reflector is required.

Since the first embodiment of the present invention represents information by using the reflector 1 in a manual scheme, a user manually opens or closes the unit reflector using a manual fixing unit such as a hinge, a magnet, a Velcro, a tape, or the like.

FIGS. 1A and 1B are views illustrating an example of a structure in which a unit reflector is manually opened or closed using magnets 21 to 26. In this case, one unit reflector 11 includes three reflective surfaces 11a to 11c, and since each reflective surface operates in an independently opened or closed state, a magnet is installed to a rear surface of each reflective surface of the one unit reflector 11. In addition, in order to open a specific reflective surface by using the magnet, a portion capable of fixing the reflective surface in an open state by the magnet is required. To this end, a plurality of fixing plates 31a to 31m are installed at appropriate positions on the rear surface of the reflector 1. In this case, the fixing plates 31a to 31m are preferably formed integrally with the reflector 1. It is preferable that the fixing plates 31a to 31m are installed at positions at which the incident light or radio waves cannot be reflected. When the fixing plates 31a to 31m are formed of a metal material, it is very convenient to fix the reflective surface by using a magnet. Therefore, the user uses a magnet installed on each reflective surface to close a specific reflective surface to the fixed plate so that the reflective surface is fixed to the fixed plate by magnetic force. The reflective surface to be opened is opened rearward at 45°. When opening the reflective surface, of course, it is preferable to predetermine the unit reflector to be opened according to the information to be represented. After the reflective surface is fixed, when the magnet is manually released from the fixing plate to change the code (information), the reflective surface is restored to its original position by elastic members 41a to 41m having elastic force, which are installed at predetermined positions on each reflective surface.

Meanwhile, since the reflector 1 of the present invention is formed in a hexagonal shape by combining six polygonal-shaped unit reflectors, the information represented using one reflector 1 is 6 bits. For convenience of description, the unit reflectors are arranged clockwise from the unit reflector 11 located at the top front based on the front, so that a hexagonal shaped reflector is implemented. Therefore, information is represented in a sequence of 1 bit of the unit reflector 11, 1 bit of the unit reflector 12, 1 bit of the unit reflector 13, 1 bit of the unit reflector 14, 1 bit of the unit reflector 15, and 1 bit of the unit reflector 16.

Figure 3A:
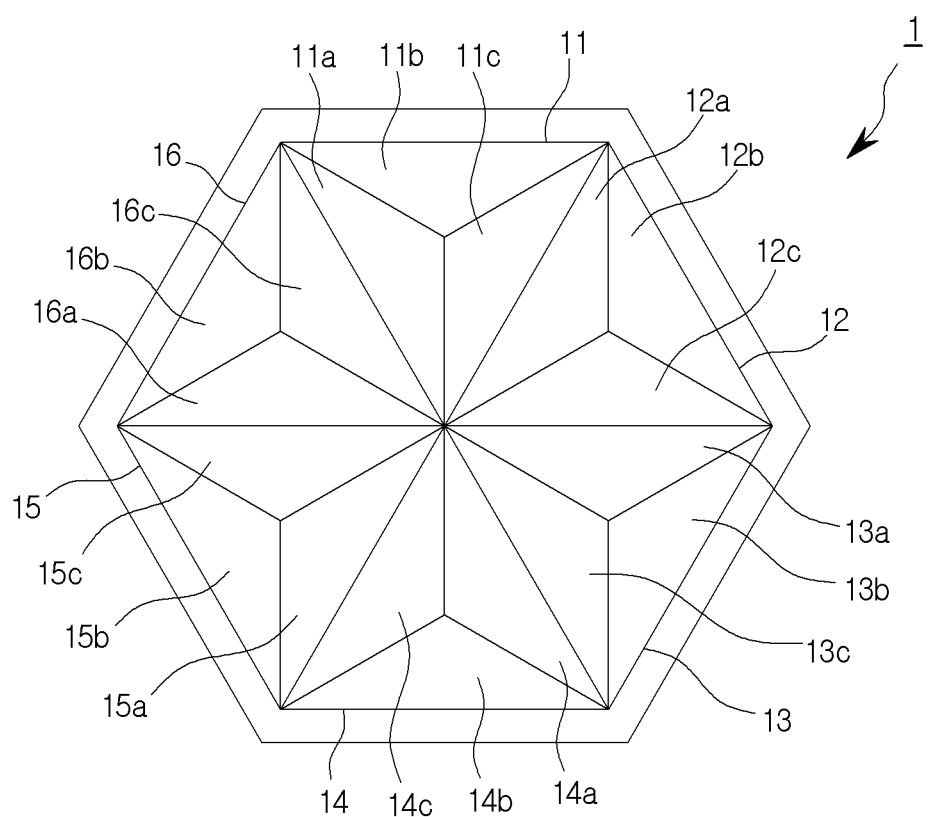
FIGS. 3A to 3C are views illustrating an operation of a reflector having an information generation function according to the present invention.
Figure 3B:
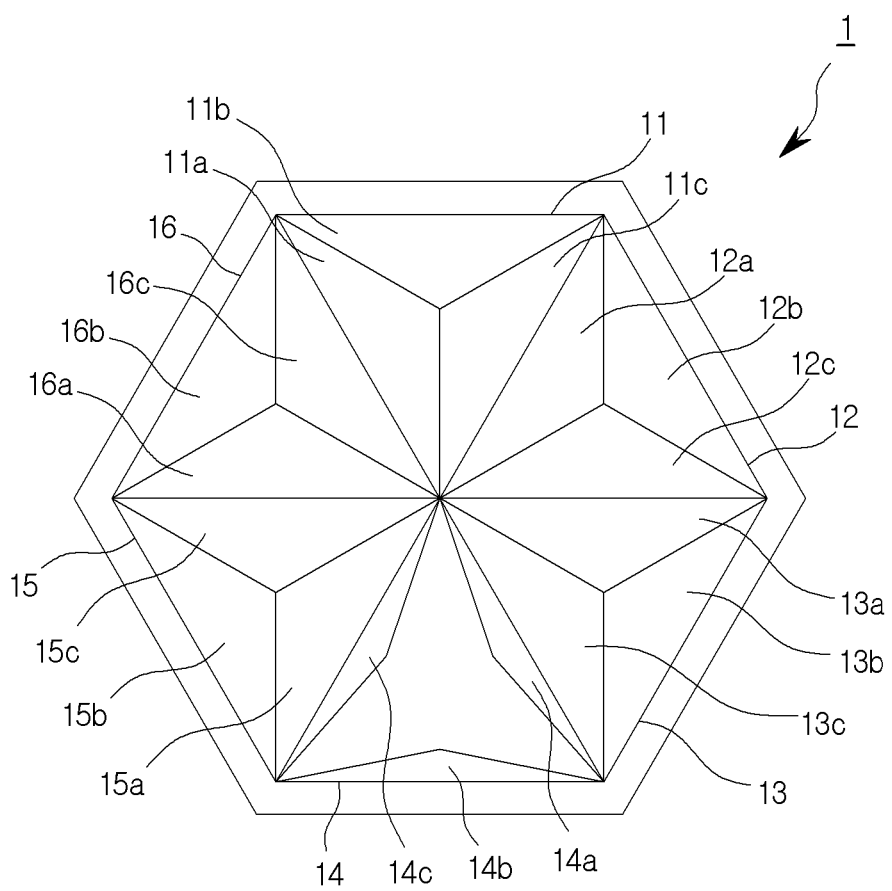
Figure 3C:
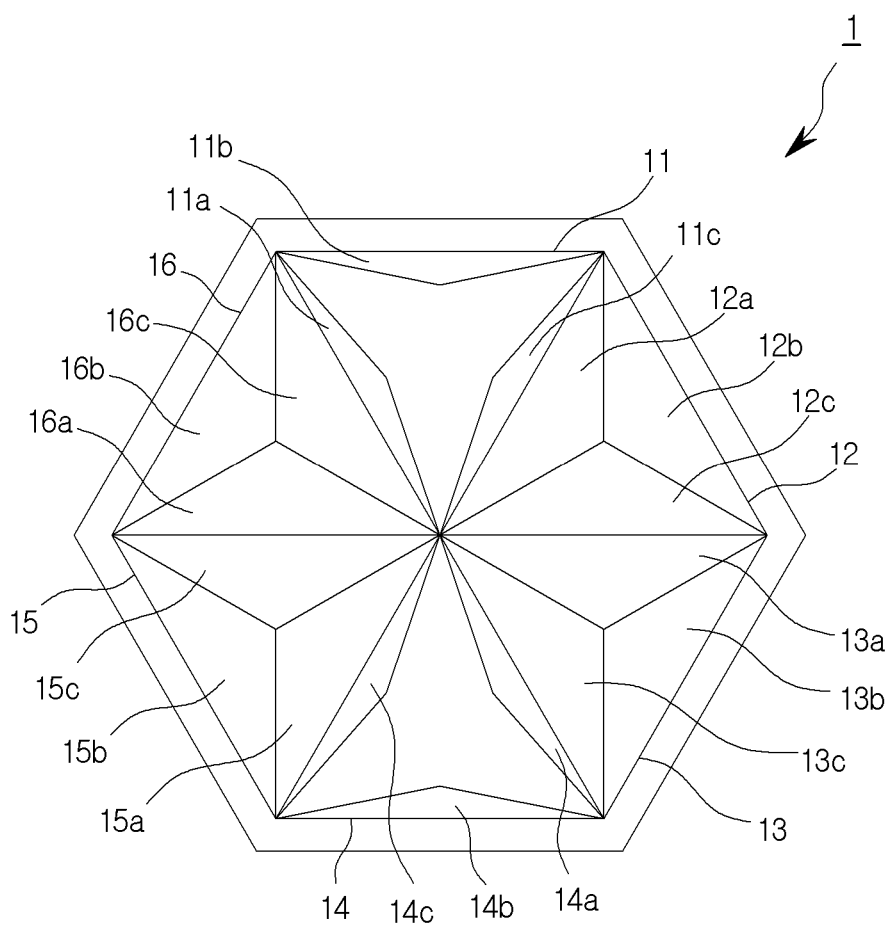

FIG. 3A is a view illustrating information represented as "111111". FIG. 3B is a view illustrating information represented as "111011". FIG. 3C is a view illustrating information represented as "011011".

The lidar system or the radar system transmits light or radio waves, and receives a signal that is retroreflected (reflected only in the incident direction) from the reflector 1. In this case, the reflection positions (areas) of the unit reflectors 11 to 16 constituting the reflector 1 are different from each other, and when the opening and closing operations of the unit reflectors are different from each other, the code information generated is different. That is, the code of the unit reflector opened is "0" because the unit reflector transmits light or radio waves, and the code of the unit reflector closed is "1" because the unit reflector reflects light or radio waves. Therefore, the position or arrangement of the signal received by the receiver also changes. The receiver receives the received signal as binary code information as described above, and combines the binary code information to form one piece of information. Then, the corresponding information is extracted from a code system embedded in a table form in advance, and information generated by the reflector 1 is recognized.

Figure 4:
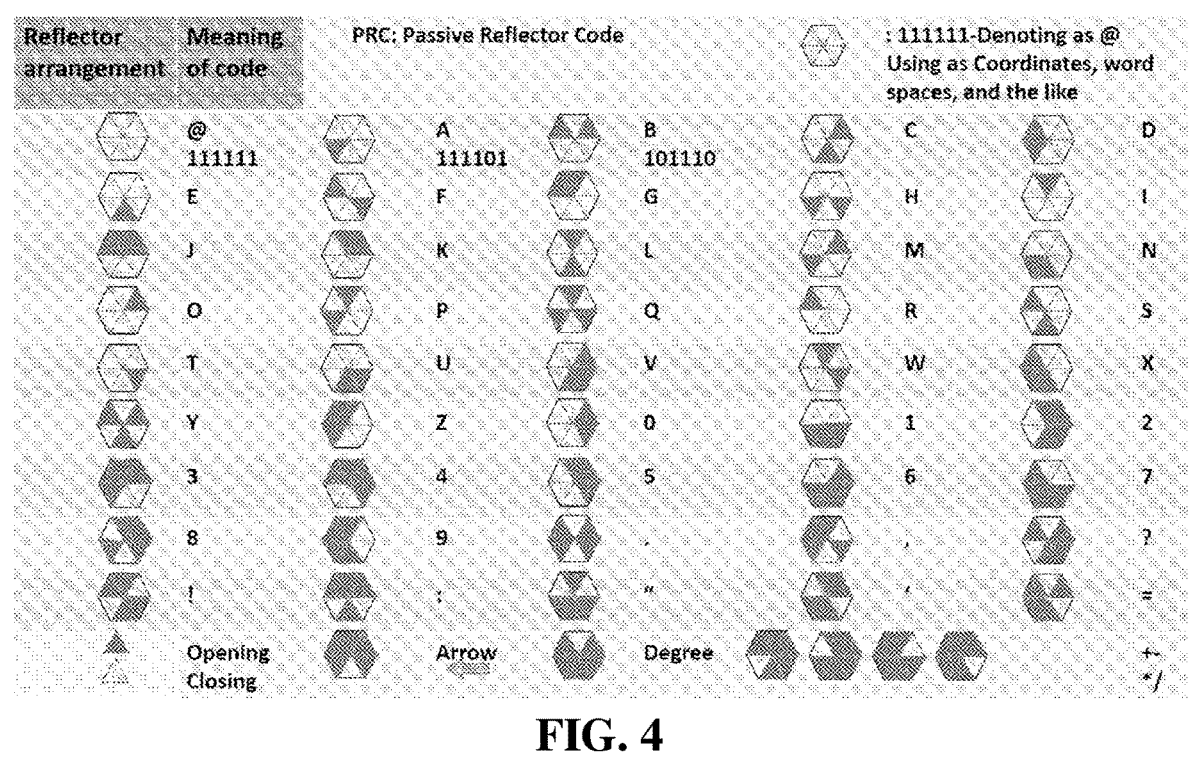

In this case, the coding system may be implemented variously, and as an example of the present invention, English letters, numbers, Hangul letters, symbols, etc., as shown in FIG. 4 are represented.

FIG. 4 is a view illustrating one example of a code system represented according to an embodiment. The present invention is not limited to such a code system, and it is possible to generate all of the information that may be represented by using 6-bit code information as described above.

For example, it is possible to represent all characters, symbols, figures, and the like such as English characters, Korean alphabet, symbol characters, figure characters, Greek characters, ruled characters, unit characters, circular characters, parentheses characters, Katakana characters, and Hiragana characters, and the like through the code system.

Figure 6A:
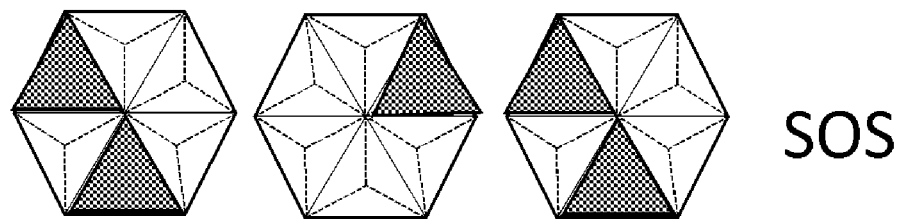
FIGS. 6A and 6B are views illustrating an example of generating information by using a reflector according to the present invention.
Figure 6B:
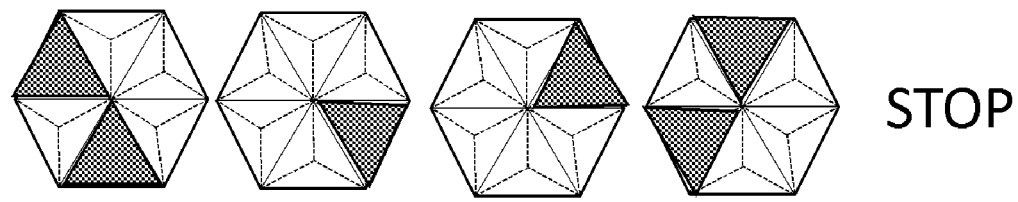

FIG. 6A is a view illustrating an example of generating information "SOS" using three reflectors based on the coding system shown in FIG. 4. FIG. 6B is a view illustrating an example of generating information "STOP" using four reflectors based on the coding system shown in FIG. 4.

The reflector 1 implemented in such a manner may be used as various information transmission units such as traffic sign boards, information sign boards, traffic lights, license plates, and the like.

Conventionally, an autonomous vehicle (AV) may be equipped with a lidar system and/or a radar system, and cannot recognize a language used by a person, and it is also impossible to recognize a traffic sign of a flat form. Meanwhile, when the traffic sign board is implemented in a scheme of providing information using a reflector as in the present invention, the reflector's sign information may be recognized based on text even with the lidar system or the radar system mounted on an autonomous vehicle, so that it is possible to utilize the reflector as a communication device or an information providing device.

For example, it is possible to use the reflector to provide preliminary information about a situation, a protected area, a dangerous area, etc. that are not recognized by an autonomous vehicle. It is possible to provide clear and specific field information such as curved roads, accident and stop vehicle information below the top of a hill, an animal appearing area, an emergency road construction, a child protection zone, prohibition of entry, a crosswalk, obstacle/lane location under deep snow, and the like.

In addition, it is possible to provide information by using a reflector in all transportation means to which the lidar systems are applied. When driving on a snowy road, it is possible to efficiently provide geographic information, sign information, etc. of the lane location. In addition, a message is transferred between ships or an aircraft and the ground by accurately retroreflecting the radio wave and light to the light source of the receiver by using reflectors rather than generating and transmitting radio wave/light/sound, so that it is possible to implement providing information that is relatively difficult to intercept.

As another application scheme, when a search aircraft is equipped with a lidar and searches for a distress target, it is a passive reflector that does not require a separate power source, so that there is no need to manage/standby after installing multiple signals. In addition, it is possible to use it for day/night recognition except for fog, heavy snow and heavy rain, and it may also be used for distress location notification and message transmission.

As an example of still another application scheme, when the reflector 1 according to the present invention is applied as a vehicle license plate, communication of each vehicle and between vehicles is also possible. That is, when the reflector is linked to a lidar system or a radar system mounted on a vehicle, communication between vehicles is possible, so that vehicles in front can also share an unexpected forward situation.

In particular, when the reflector 1 is applied to a vehicle license plate, it is possible to recognize vehicle information and utilize it for speeding of an individual vehicle, and it is also possible to simultaneously control speeding of a plurality of vehicles. In addition, when the reflector 1 is applied to a vehicle license plate, it is possible that vehicles instantly communicate with each other while driving. By using this, it is possible to transmit the state information of the vehicle in front, thereby preventing collision of the vehicle and recognizing the vehicle moving state of the vehicle in front, that is, rotation, U-turn, and slow intention. It is also possible to transmit the information about one's own vehicle to nearby vehicles by using the reflector as the vehicle license plate.

As described above, the reflector of the present invention is not limited to simply information transmission, and may provide information in the form of a message through various information expressions. For example, when there is an accident or construction downhill after the top of a hill that a radar or lidar cannot check, if a lidar or a radar readable reflector is installed in a top area, a truck with along braking distance prepares a pre-deceleration or response mode, so that it can be used very effectively to prevent traffic accidents.

Embodiment 2

Figure 2A:
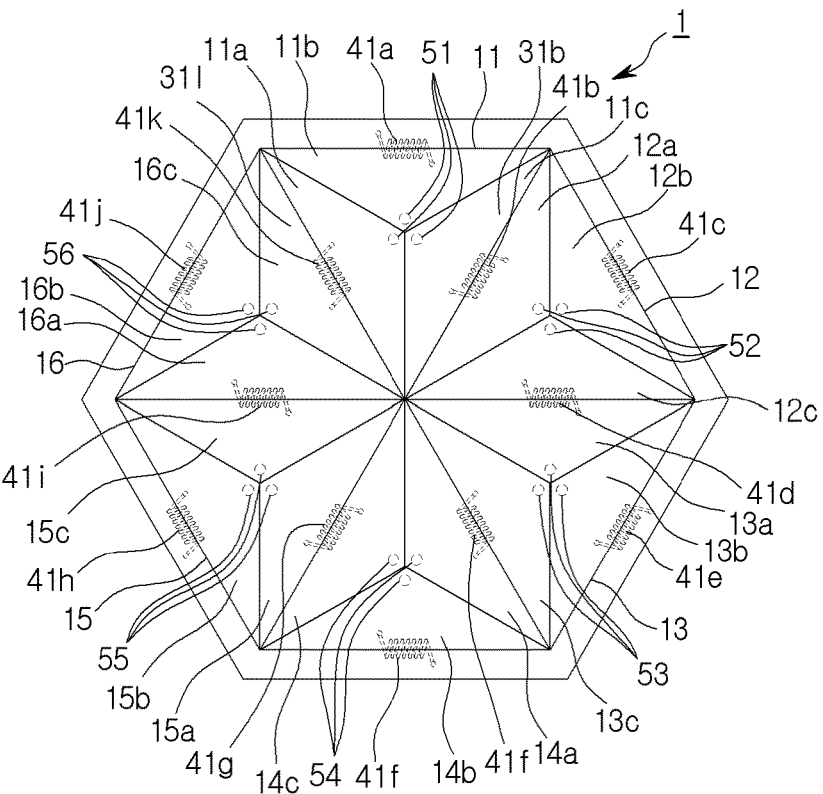
FIG. 2A is a front view of a reflector having an information generation function according to a second embodiment of the present invention.
Figure 2B:
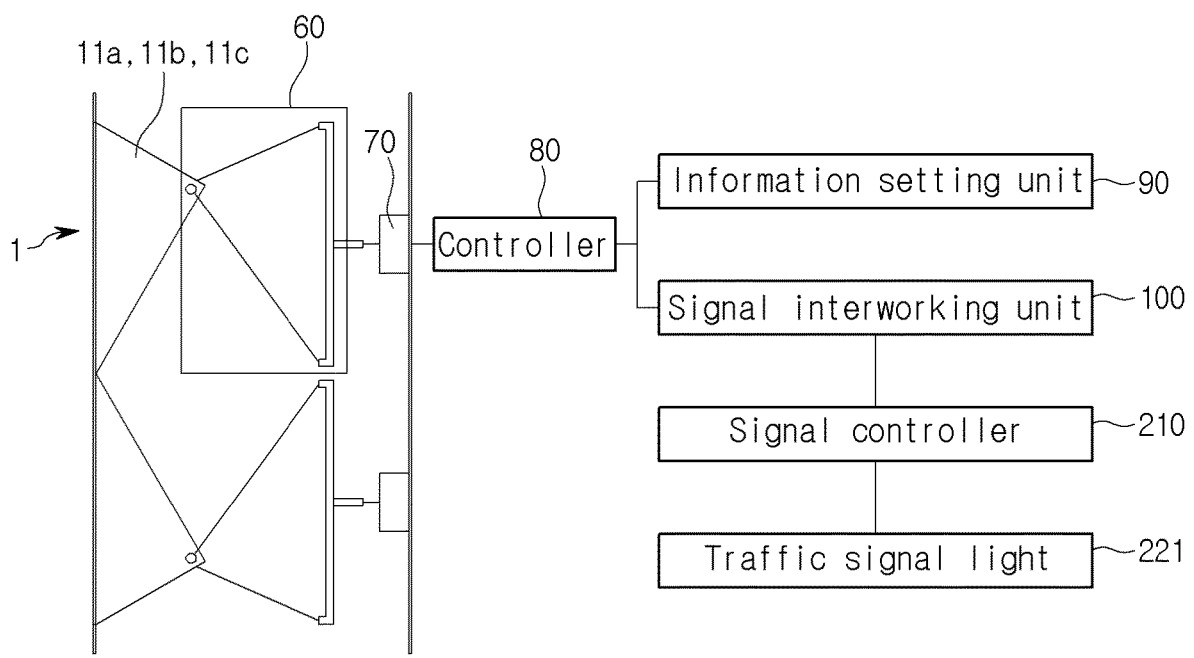
FIG. 2B is a cross-sectional view of a reflector having an information generation function according to the second embodiment of the present invention.

FIG. 2A is a front view of a reflector having an information generation function according to a second embodiment of the present invention. FIG. 2B is a cross-sectional view of a reflector having an information generation function according to the second embodiment of the present invention.

A reflector 1 having an information generation function according to the first embodiment of the present invention is implemented by connecting a plurality of unit reflectors 11 to 16 that represent information through code generation, where each unit reflector 11 to 16 reflects or transmits light or radio waves to represent information. In this case, the unit reflectors mean small reflectors having the same size and shape that constitute the entire reflector 1.

Since the configuration and operation of each unit reflector 11 to 16 are the same, only one reflector (e.g., 11) will be described below.

The unit reflector 11 is formed with a plurality of reflective surfaces 11a to 11c capable of receiving and reflecting light or radio waves, and has a triangular pyramid shape by combining the plurality of reflective surfaces 11a to 11c. Each reflective surface is preferably manufactured by using a metal material, or attaching a metal film thereon or coating a metal material to reflect light or radio waves.

Further, in order to increase the focus and sharpness of the reflected light, a lens may be added to the front surfaces of the plurality of unit reflectors 11 to 16. The lens may be formed as a single lens that accommodates all the unit reflectors, or may be formed as a plurality of lenses, the number of which corresponds to that of unit reflectors. The lens may be installed to be spaced apart from the front surface of the reflector 1 by a predetermined interval, and be simply installed in a scheme of fixing one end of the lens to one end of the reflector 1.

In addition, the triangular pyramid shaped unit reflector 11 including a plurality of reflective surfaces is combined (arranged) to allow the reflective surface of an adjacent unit reflector (e.g., 12) to be connected at an angle of 90° based on the front surface thereof, so that the reflector 1 is implemented to generate information.

Preferably, the single unit reflector 11 generates a code in binary (0, 1) to express information. A real lidar system or a radar system transmits light or radio waves, and receives light or radio waves reflected from the reflector 1 to recognize information. Therefore, when the unit reflector 11 is closed, light or radio waves are reflected, and thus a sign "1" is generated, When the unit reflector 11 is opened, light or radio waves are transmitted and there is no reflected signal, and thus a sign "0" is generated. One unit reflector represents one bit of information.

In this case, in order to represent information with the unit reflector 11, an opening and closing unit for opening or closing each unit reflector is required.

Since the second embodiment of the present invention is a scheme of representing information by using the reflector 1 in an automatic scheme, an opening and closing unit 60 is installed on a rear surface of each unit reflector, and a driving unit such as an actuator 70 is used to automatically open or close the opening and closing unit 60, thereby generating information.

FIGS. 2a and 2b illustrate a structure in which a connecting ring is installed on each reflective surface and connected to a driving unit (a string or a rod, a servo and a step motor, a hydraulic/pneumatic cylinder, etc.) of the opening/closing unit 60, and an actuator 70 is used to pull the driving unit, thereby opening the reflective surface. In this case, as another scheme, after a magnet is installed on the reflective surface and an electromagnet is installed to the opening and closing unit 60, electric power is supplied to the electromagnet or cut off according to the code information to be represented to magnetize or non-magnetize the electromagnet, thereby opening or closing the reflective surface.

In the case of using connecting rings, one unit reflector 11 includes three reflective surfaces 11a to 11c, and since each reflective surface operates in an independently open or closed state, connection rings (or magnets) 51 to 56 are installed on the rear surface of each reflective surface of the one unit reflector 11. Thereafter, the actuator 70 may be operated to drive the driving unit of the opening and closing unit 60, thereby automatically opening the reflective surface. In this case, it is preferable that the opening and closing unit 60 or the actuator 70 is installed at a position where the incident light or radio waves cannot be reflected.

The user inputs information to be generated using the reflector 1 through an information setting unit 90. In this case, the information setting unit 90 may be implemented by simply using an information input device such as a keypad or a communication module capable of receiving information transmitted remotely. When the information setting unit 90 is implemented with a communication module, the inconvenience of a user manually entering information by going to a location where the reflector 1 serving as a traffic sign is installed can be eliminated.

When the desired information to be provided through the information setting unit 90 is input, a controller 80 drives the actuator (e.g., 70) corresponding to the information to be provided to operate the opening and closing unit 60, and the reflective surface of the connected unit reflector is opened according to the operation of the opening and closing unit 60 so that code information "0" is generated. When it is desired to generate code information "1" by using the corresponding unit reflector, the reflective surface of the unit reflector is not opened to be kept in the closed state.

The reflective surface to be opened opens 450 rearward. When the reflective surface of the open unit reflector is to be restored to its original position, the actuator 70 is turned off to turn off the opening and closing unit 60. When the opening and closing unit 60 is turned off, the reflective surface is restored to its original position by elastic members 41a to 41m having elastic force installed at predetermined positions on each reflective surface.

Therefore, when the user simply sets only the desired information through the information setting unit 90, the controller 80 recognizes the setting information, and drives the actuator 70 correspondingly to generate code information through the unit reflector. In this case, the actuator is installed corresponding to each unit reflector. Therefore, in order to operate only a specific unit reflector, only an actuator corresponding thereto needs to be operated. In order to select the actuator to be driven according to the setting information, a control table is prepared in a memory built in the controller 80 in advance, and the actuator to be driven is selected from the control table according to the setting information, so that it is possible to control the actuator in real time.

Meanwhile, since the reflector 1 of the present invention is formed in a hexagonal shape by combining six polygonal-shaped unit reflectors, the information represented using one reflector 1 is 6 bits. For convenience of description, the unit reflectors are arranged clockwise from the unit reflector 11 located at the top front based on the front, so that a hexagonal shaped reflector is implemented. Therefore, information is represented in a sequence of 1 bit of the unit reflector 11, 1 bit of the unit reflector 12, 1 bit of the unit reflector 13, 1 bit of the unit reflector 14, 1 bit of the unit reflector 15, and 1 bit of the unit reflector 16.

FIG. 3A is a view illustrating information represented as "111111". FIG. 3B is a view illustrating information represented as "111011". FIG. 3C is a view illustrating information represented as "011011".

The lidar system or the radar system transmits light or radio waves, and receives a signal that is retroreflected (reflected only in the incident direction) from the reflector 1. In this case, the reflection positions (areas) of the unit reflectors 11 to 16 constituting the reflector 1 are different from each other, and when the opening and closing operations of the unit reflectors are different from each other, the code information generated is different. That is, the code of the unit reflector opened is "0" because the unit reflector transmits light or radio waves, and the code of the unit reflector closed is "1" because the unit reflector reflects light or radio waves. Therefore, the position or arrangement of the signal received by the receiver also changes. The receiver receives the received signal as binary code information as described above, and combines the binary code information to form one piece of information. Then, the corresponding information is extracted from a code system embedded in a table form in advance, and information generated by the reflector 1 is recognized.

In this case, the coding system may be implemented variously, and as an example of the present invention, English letters, numbers, Hangul letters, symbols, etc., as shown in FIG. 4 are represented.

FIG. 4 is a view illustrating one example of a code system represented according to an embodiment. The present invention is not limited to such a code system, and it is possible to generate all of the information that may be represented by using 6-bit code information as described above.

For example, it is possible to represent all characters, symbols, figures, and the like such as English characters, Korean alphabet, symbol characters, figure characters, Greek characters, ruled characters, unit characters, circular characters, parentheses characters, Katakana characters, and Hiragana characters, and the like through the code system.

The reflector 1 implemented in such a manner may be used as various information transmission units such as traffic sign boards, information sign boards, traffic lights, license plates, and the like.

Conventionally, an autonomous vehicle (AV) may be equipped with a lidar system and/or a radar system, and cannot recognize a language used by a person, and it is also impossible to recognize a traffic sign of a flat form. Meanwhile, when the traffic sign board is implemented in a scheme of providing information using a reflector as in the present invention, the reflector's sign information may be recognized even with the lidar system or the radar system mounted on an autonomous vehicle, so that it is possible to utilize the reflector as a communication device or an information providing device.

For example, it is possible to use the reflector to provide preliminary information about a situation, a protected area, a dangerous area, etc. that are not recognized by an autonomous vehicle. It is possible to provide clear and specific field information such as curved roads, accident and stop vehicle information below the top of a hill, an animal appearing area, an emergency road construction, prohibition of entry, a child protection zone, a crosswalk, and obstacle/lane location under deep snow, situation occurrence starting and ending locations, and the like.

In addition, it is possible to provide information by using a reflector in all transportation means to which the lidar systems are applied. When driving on a snowy road, it is possible to efficiently provide geographic information, sign information, etc. of the lane location. In addition, a message is transferred between ships or an aircraft and the ground by accurately retroreflecting the radio wave and light to the light source of the receiver by using reflectors rather than generating and transmitting radio wave/light/sound, so that it is possible to implement providing information that is relatively difficult to intercept.

As another application scheme, when a search aircraft is equipped with a lidar and searches for a distress target, it is a passive reflector that does not require a separate power source, so that there is no need to manage/standby after installing multiple signals. In addition, it is possible to use it for day/night recognition except for fog, heavy snow and heavy rain, and it may also be used for distress location notification and message transmission.

Meanwhile, it is possible to allow the lidar or radar system to recognize the traffic signal light information by interworking with link the reflector according to the present invention.

Figure 5A:
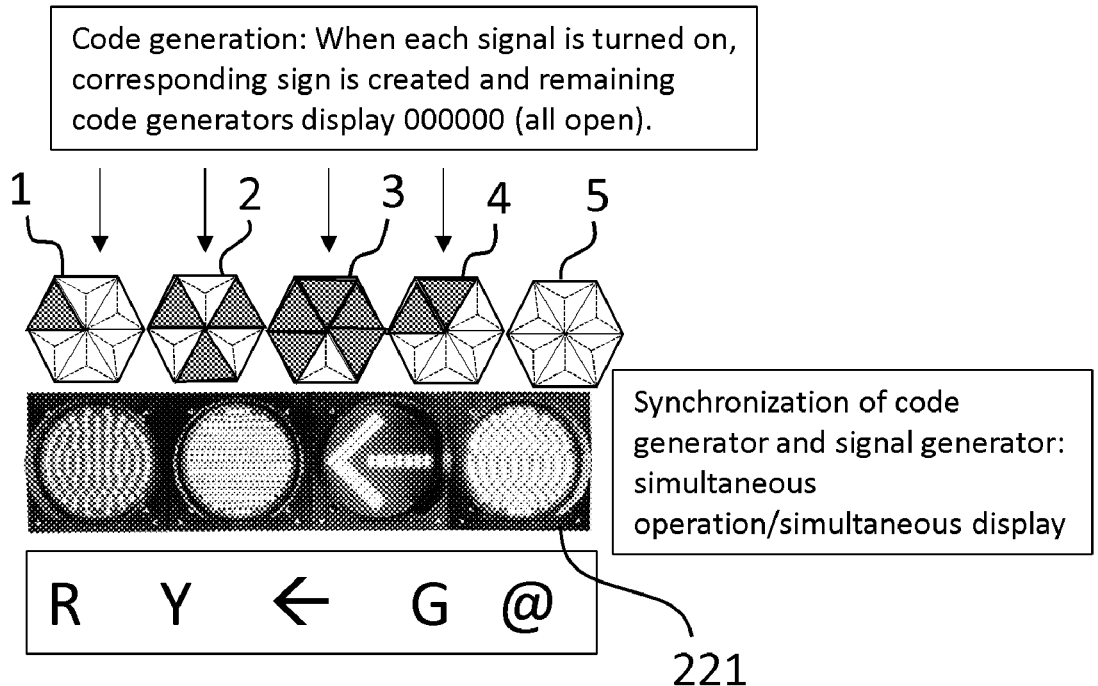
FIGS. 5A to 5D are views illustrating an example of providing information by connecting a reflector according to the present invention to a traffic signal light or a pedestrian traffic signal light.

For example, when it is desired to represent the information about a traffic signal light 221 shown in FIG. 5A, a signal controller 210 for controlling a signal of the traffic signal light 221 and a signal interworking unit 100 interwork with each other such that the traffic signal light information is obtained and transmitted to the controller 80. When the traffic signal light information is obtained through the signal interworking unit 100, the controller 80 may recognize the traffic signal light information by using the control table previously stored in the internal memory, and control the actuator 70 in the same scheme as the information recognition and control scheme set by the information setting unit 90, thereby generating the traffic signal light information by using the plurality of reflectors 1 to 5. The purpose of adding a signal generator together with a code generator in connection with traffic signal lights is to eliminate system confusion by informing that the signal is changing when the code is changed because the frame rate of the lidar and radar is 10 to 450 frame per second (FPS) unlike the driver's visual recognition. Considering that flickering in the existing LED traffic signal lights confuses the algorithm of an AV vehicle, it is possible to solve the problem by ignoring all codes when the signal generator is '0' (open). Since the scheme of representing information using the plurality of reflectors 1 to 5 is the same as the scheme described above, the detailed description will be omitted.

Figure 5B:
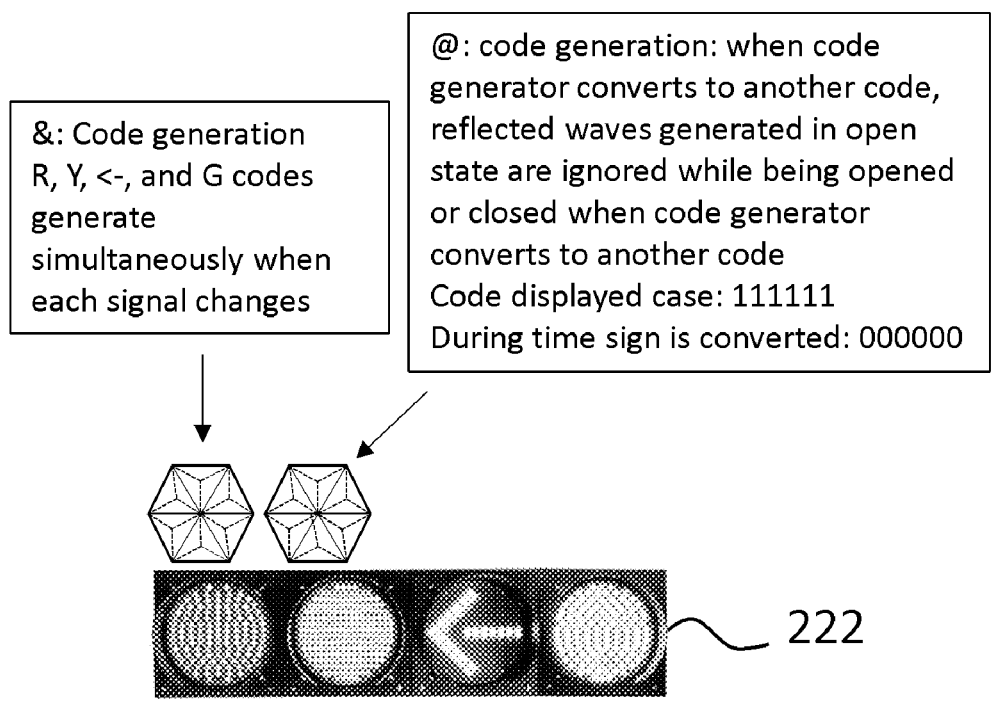
Figure 5C:
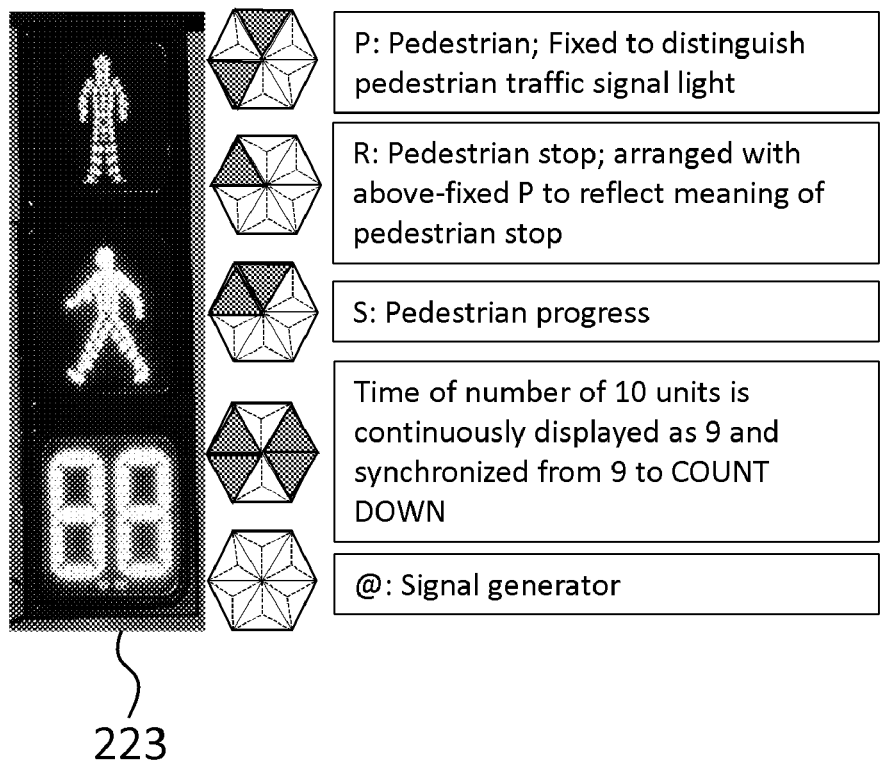
Figure 5D:
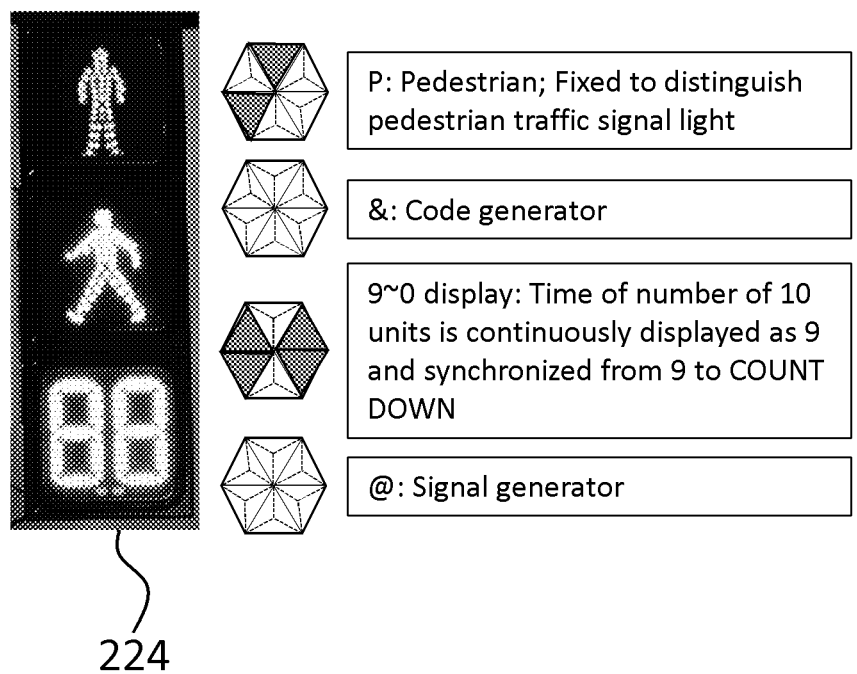

FIGS. 5B to 5D are views illustrating examples of representing information of a traffic signal light and a pedestrian traffic signal light by using the plurality of reflectors in the same principle as in FIG. 5A.

Although the invention made by the present inventors has been described in detail according to the above embodiment, the present invention is not limited to the described embodiments, and those skilled in the art will appreciate that various modifications, additions and substitutions are possible, without departing from the scope and spirit of the invention as disclosed in the accompanying claims.

INDUSTRIAL APPLICABILITY

The present invention is applied to a technique of generating a code by using a reflector and providing information by using the generated code.

The invention claimed is:

1. A reflector having an information generation function, the reflector comprising:
    a plurality of unit reflectors for representing information through code generation,
    wherein each of the plurality of reflectors reflects or transmits light or a radio wave to represent information,
    lenses are formed on front surfaces of the plurality of unit reflectors to increase a focus and a sharpness of a reflected light,
    a number of the lenses corresponds to a number of the plurality of unit reflectors in one to one correspondence, and
    the information includes at least one of an English alphabet, a Korean alphabet, a symbolic character, a graphic character, a Greek character, a ruled character, a unit character, a circular character, a parentheses character, a katakana character, and a hiragana character.

2. The reflector of claim 1, wherein the unit reflector generates a binary code to represent information.

3. The reflector of claim 1, wherein each of the plurality of unit reflectors has a polygonal shape, and the plurality of unit reflectors are combined to form a hexagonal shape.

4. The reflector of claim 3, wherein the plurality of unit reflectors generate 6-bit information using each unit reflector.

5. The reflector of claim 2, wherein the unit reflectors are combined such that reflective surfaces of adjacent unit reflectors are connected at 90° based on a front surface.

6. The reflector of claim 2, wherein the unit reflector is formed with a plurality of reflective surfaces for receiving and reflecting light or radio waves, and the plurality of reflective surfaces are combined to have a triangular pyramid shape.

7. The reflector of claim 6, wherein the reflective surface of the unit reflector is formed of a metal material to reflect light or radio waves.

8. A reflector having an information generation function, the reflector comprising:
 a plurality of unit reflectors for representing information through code generation;
 an opening and closing unit for opening or closing a plurality of reflective surfaces constituting each unit reflector to generate a code; and
 a lens formed on front surfaces of the plurality of unit reflectors to increase a focus and a sharpness of reflected light,
 wherein a number of lenses corresponds to a number of the unit reflectors in one to one correspondence, and
 the information includes at least one of an English alphabet, a Korean alphabet, a symbolic character, a graphic character, a Greek character, a ruled character, a unit character, a circular character, a parentheses character, a katakana character, and a hiragana character.

9. The reflector of claim 8, wherein the opening and closing unit includes a fixing unit including one of a hinge, a magnet, a Velcro, and a tape.

10. The reflector of claim 8, further comprising:
 a controller configured to control opening or closing of the plurality of reflective surfaces; and
 an actuator configured to automatically operate the opening and closing unit according to control of the control unit.

11. The reflector of claim 8, wherein the opening and closing unit is configured to open the plurality of reflective surfaces rearward from a closed state or to restore the plurality of reflective surfaces to an initial state.

12. The reflector of claim 10, further comprising an information setting unit configured to set information to be represented,
 wherein the controller is configured to control an operation of the actuator based on the information set by the information setting unit to represent information by opening or closing the plurality of unit reflectors.

13. The reflector of claim 10, further comprising a signal interworking unit configured to interwork with a traffic signal light controller for controlling a traffic signal light to receive traffic signal light information,
 wherein the controller is configured to recognize the traffic signal light information, which is received through the signal interworking unit, as a binary and control the actuator to represent information corresponding to the traffic signal light.

14. The reflector of claim 10, wherein the opening and closing unit is configured to open the plurality of reflective surfaces rearward from a closed state or to restore the plurality of reflective surfaces to an initial state.

* * * * *